US008078132B2

(12) United States Patent
Wang

(10) Patent No.: US 8,078,132 B2
(45) Date of Patent: Dec. 13, 2011

(54) SELECTIVELY SKIPPING LISTEN WINDOWS IN POWER SAVING MODE IN MULTI-MODE RADIO HANDSETS

(75) Inventor: Huaiyuan Wang, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 961 days.

(21) Appl. No.: 12/028,032

(22) Filed: Feb. 8, 2008

(65) Prior Publication Data

US 2009/0203325 A1    Aug. 13, 2009

(51) Int. Cl.
*H04B 1/10* (2006.01)
(52) U.S. Cl. ................ 455/306; 455/343.2; 455/574
(58) Field of Classification Search ............... 455/306
See application file for complete search history.

(56) References Cited

U.S. PATENT DOCUMENTS

| 6,597,679 | B1 | 7/2003 | Willars | |
|---|---|---|---|---|
| 7,295,827 | B2* | 11/2007 | Liu et al. | 455/343.2 |
| 2007/0104141 | A1* | 5/2007 | Park et al. | 370/329 |
| 2009/0291717 | A1* | 11/2009 | Lee et al. | 455/574 |

FOREIGN PATENT DOCUMENTS

WO    WO 2007/053851    5/2007

OTHER PUBLICATIONS

3GPP RAN WG2: "Evolved Universal Terrestrial Radio Access (E-UTRA) and Evolved Universal Terrestrial Radio Access Network (E-UTRAN); Radio interface protocol aspects (Release 7), 3GPP TR 25.813 V7 .1.0", Oct. 18, 2006, 41 pages.
Notification of Transmittal of the International Search Report and the Written Opinion of the International Searching Authority, or the Declaration, corresponding to PCT/US2008/079067, Mar. 23, 2009, 18 pages.

* cited by examiner

*Primary Examiner* — Duc Nguyen
*Assistant Examiner* — Ajibola Akinyemi
(74) *Attorney, Agent, or Firm* — Sreenivas Vedantam; Moore & Van Allen, PLLC

(57) ABSTRACT

Disclosed is a method of selectively skipping one or more listen windows during power saving (i.e., sleep mode) operation in a multi-mode radio handset capable of operating on a plurality of radio access networks (RANs). A multi-mode radio handset signals a base station to which it is currently in communication to request that one or more listen windows be skipped considering the delay and jitter requirements of the most time critical application currently running. The request includes data defining a different listen and sleep window sequence. The multi-mode radio handset receives an acknowledgment from the base station indicating that the request has been granted. The acknowledgement includes a start frame parameter that defines when the different listen and sleep window sequence will begin. Upon completion of the different listen and sleep window sequence, the multi-mode radio handset reverts back to the original alternating sequence of listen and sleep windows.

20 Claims, 5 Drawing Sheets

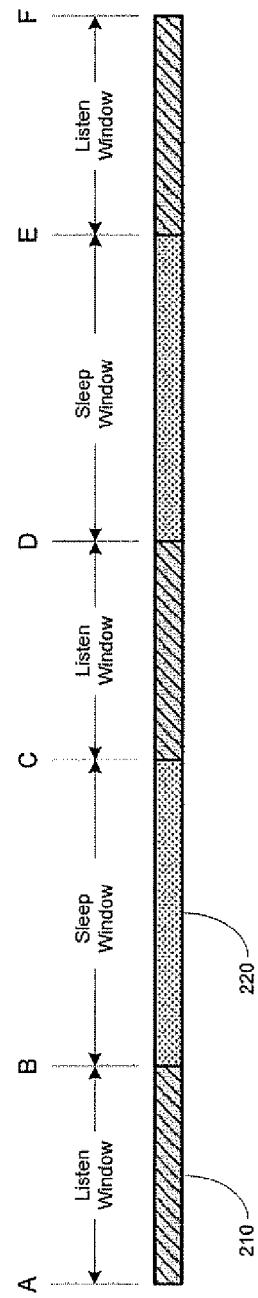
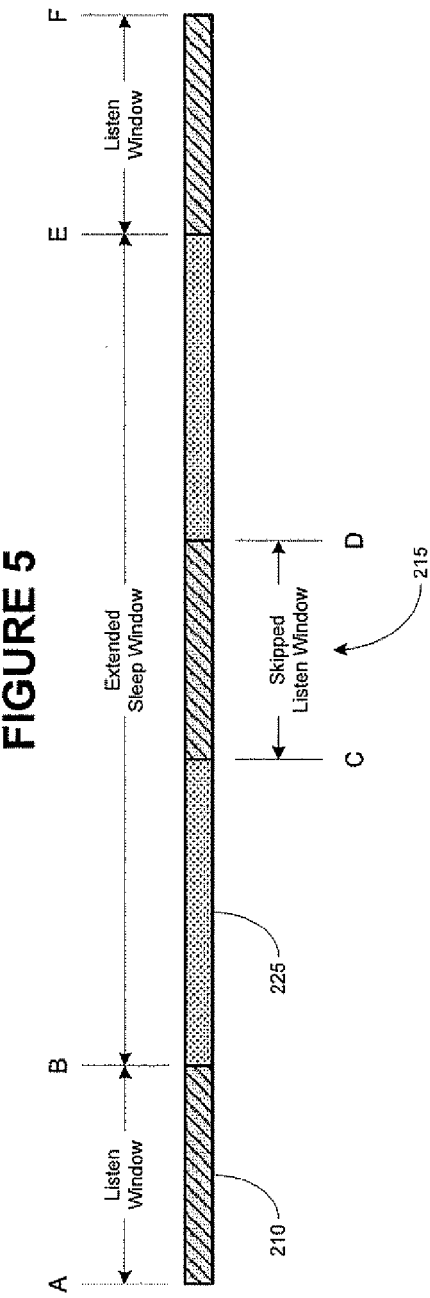

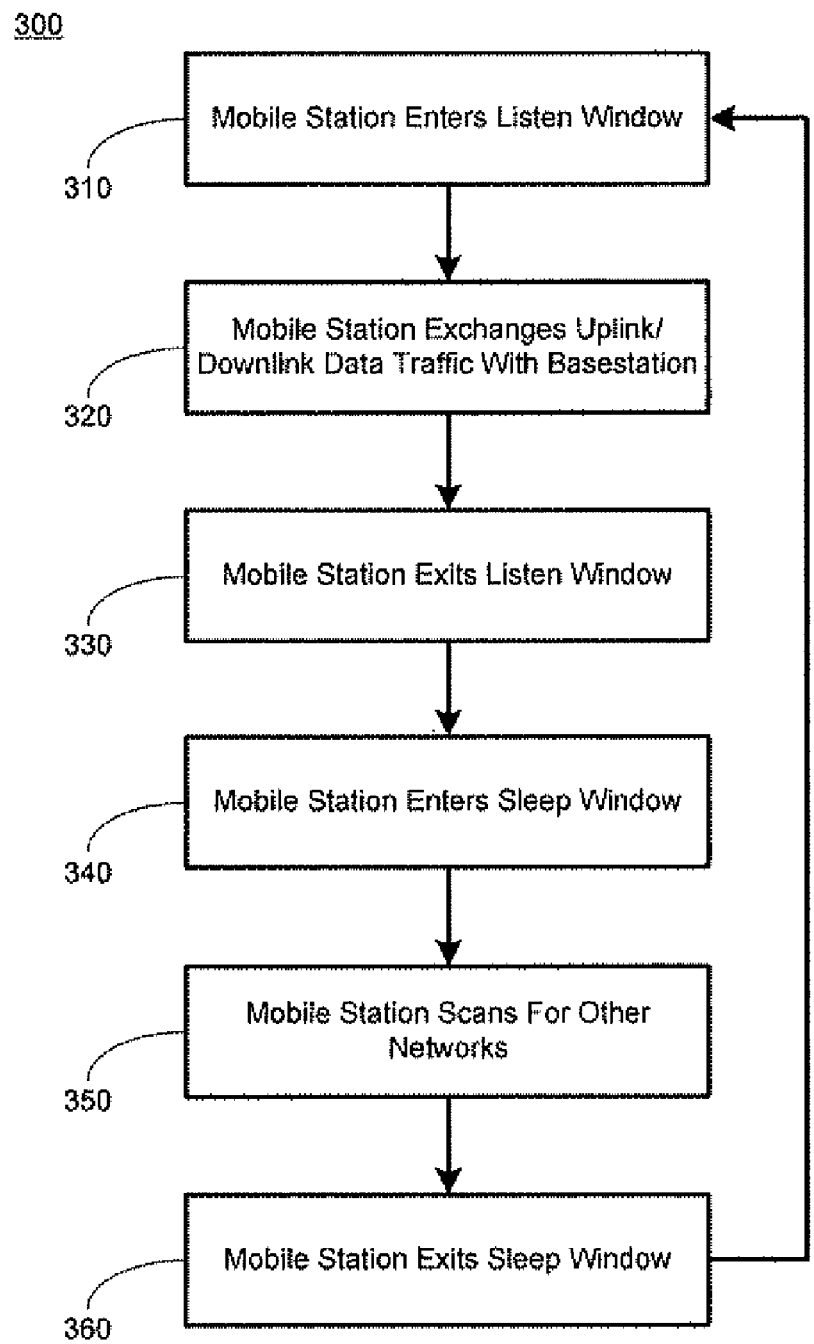

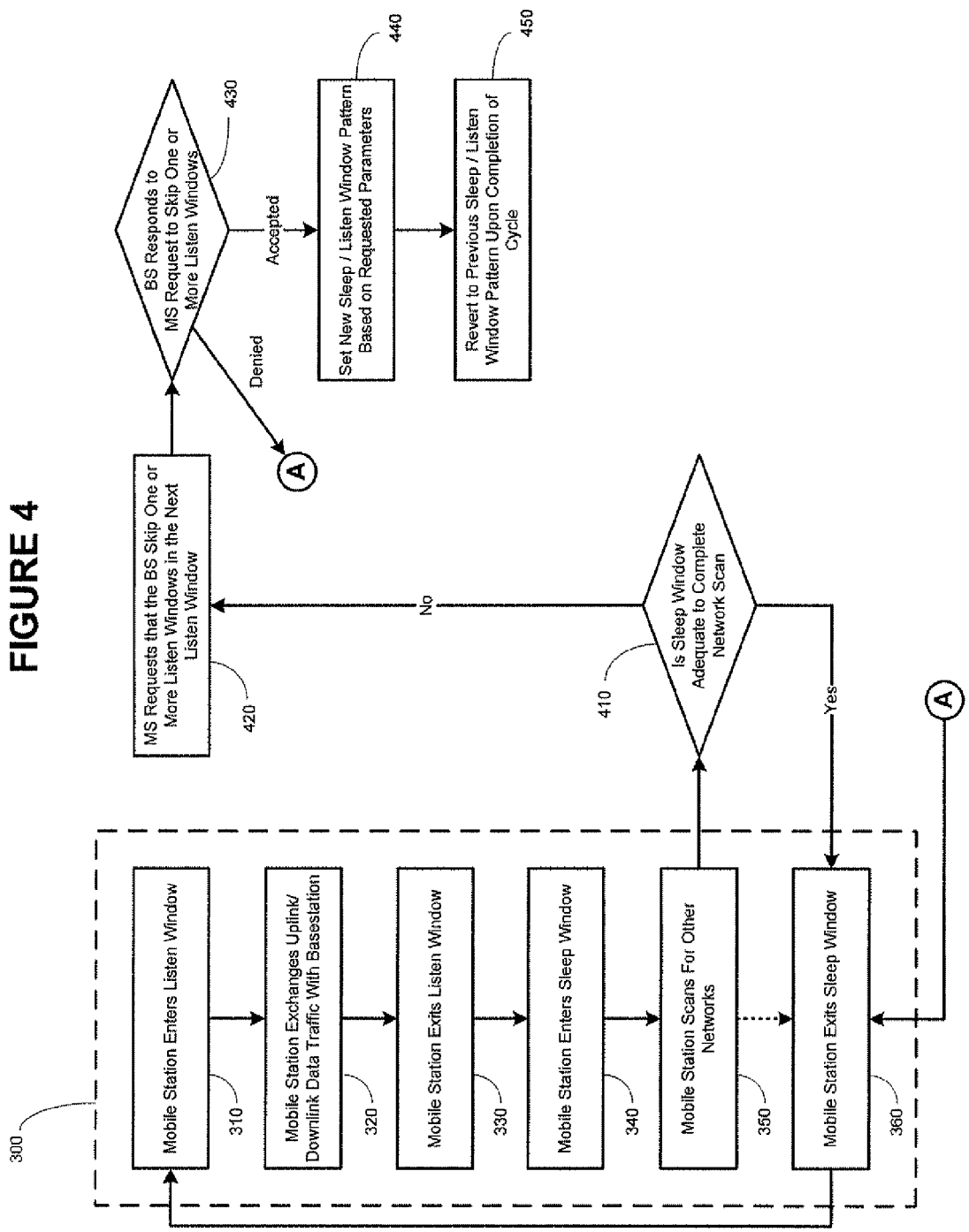

SELECTIVELY SKIPPING LISTEN WINDOWS IN POWER SAVING MODE IN MULTI-MODE RADIO HANDSETS

SUMMARY

Disclosed is a method, multi-mode radio handset, and computer readable medium for selectively skipping one or more listen windows in power saving mode in a multi-mode radio handset capable of operating on a plurality of radio access networks (RANs). A multi-mode radio handset signals a base station with which it is currently engaged in power saving mode of operation to request that one or more predefined listen windows be skipped. The request includes data defining a listen window skipping sequence. The request includes an offset parameter defining the first listening window to be skipped, the number of consecutive listen window to be skipped, and the number of times such skip operation is repeated. The multi-mode radio handset receives a confirmation from the base station indicating that the request has been granted or denied. Upon completion of the skip sequence, the multi-mode radio handset reverts back to the original alternating pattern of listen and sleep windows. The base station and the multi-mode radio handset will buffer data traffic during the skipped listen windows. Furthermore, the base station will not provide bandwidth allocations to the multi-mode radio handset during skipped listen windows.

The data defining a different listen window skipping sequence includes an offset parameter that specifies the number of listen windows between the current listen window and the first listen window to be skipped. It also includes a number of listen windows to be skipped parameter that specifies the number of consecutive listen windows to be skipped as well as a number of times to repeat the skipping pattern parameter that specifies the how often to repeat the skipping pattern before reverting to the original alternating sequence.

The signaling between the multi-mode radio handset and bas station can comprises in-band signaling in the form of a piggy-backed sub header or out-band signaling in the form of an optional information element (IE) embedded in a medium access control (MAC) management message.

BRIEF DESCRIPTION OF THE DRAWINGS

FIG. 2 is a prior art representation of a typical sleep window/listen window sequence.

FIG. 3 is a prior art data flow diagram for a typical sleep window/listen window sequence.

FIG. 4 is a flowchart for a sleep window/ listen window sequence according to the present invention.

FIG. 5 is a representation of a sleep window/listen window sequence according to an embodiment of the invention.

DETAILED DESCRIPTION OF THE INVENTION

Figure 1:
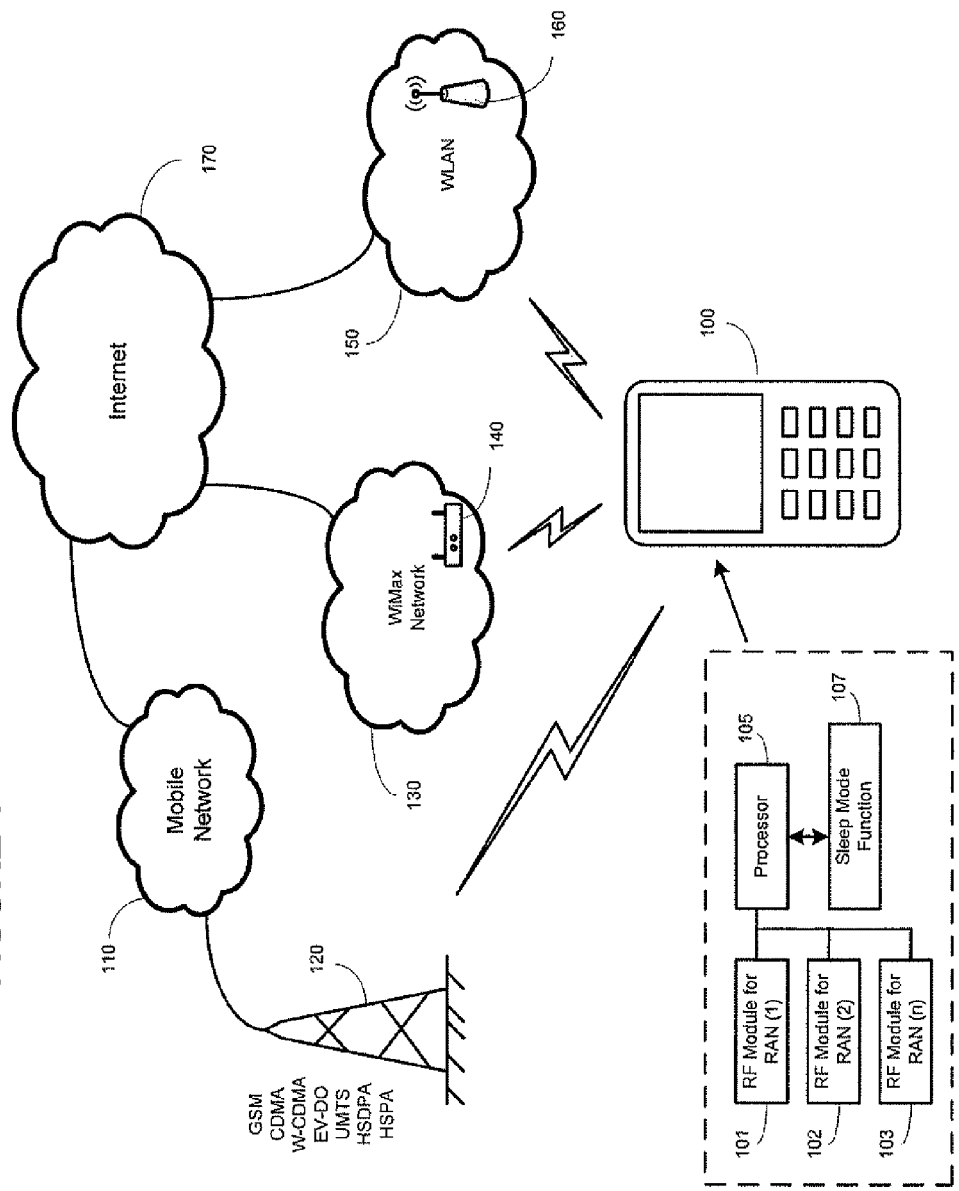
FIG. 1 is a network diagram illustrating some of the multiple networks that can be accessed by a multi-mode radio handset.

FIG. 1 is a network diagram illustrating some of the multiple networks that can be accessed by a multi-mode radio handset 100. Multi-mode radio handsets refer to radio handsets that are capable of supporting multiple radio access networks simultaneously. A multi-mode radio handset 100 can communicate with several radio access networks (RANs) including, but not limited to, a mobile network 110 via a base station 120 (e.g., GSM, CDMA, W-CDMA, EV-DO, UMTS, HSPDA, HSPA), a WiMax network 130 via a WiMax base station in the form of a WiMax wireless access point 140, and a WLAN 150 via a WLAN base station in the form of a WLAN wireless access point 160. Those networks may, in turn, be connected with the Internet 170 or other voice/data networks (not shown). Thus, the term base station is intended to encompass any device used by a network that provides a point of communication with the radio handset 100.

The multi-mode radio handset 100 includes a processor 105 that controls the overall operation of the multi-mode radio handset 100. The processor 105 is coupled with a plurality of RF modules 101, 102, 103 that are each capable of communication with separate radio access networks (RANs) 110, 130, 150 via respective base stations 120, 140, 160. The multi-mode radio handset 100 also includes a sleep mode software function 107. The sleep mode software function 107 manages power saving operations (i.e., sleep mode) that manage a sleep mode comprised of sleep windows and listen windows. The sleep mode software function 107 can request and implement a sleep window/listen window skipping sequence within the predefined sleep mode operation so that one or more listen windows can be selectively skipped to allow for more time to perform off-channel operations during the resulting extended sleep window.

A multi-mode radio handset 100 is capable of communicating with several of these networks but can only communicate with one at a time. While connected to one network the multi-mode radio handset 100 needs to monitor for the presence of other networks to support an inter-RAN handoff. To conserve battery power, a radio handset will enter a sleep mode state while running an application. Sleep mode is a state defined as an alternating sleep window and listen window. The radio handset exchanges data traffic with the serving base station during the listen window period. In the sleep window period, the radio handset can perform off-channel network scan operations to search for other networks that are within range.

The scanning function is important. Consider an application such as video streaming running on the multi-mode radio handset that utilizes a nearby WiMax network. Since WiMax coverage is currently spotty, chances are good that the multi-mode radio handset will leave the effective range of the WiMax network if the user is on the move. If that were to occur while in the middle of running the video streaming application, the video stream could be terminated unless there is an inter-RAN handoff to a viable alternative network that would satisfy the requirements of the video streaming application. If the multi-mode radio handset is not given enough time during the sleep window to perform network scans, it is possible that viable alternative networks that are within range may not be discovered. In such a case, the application will fail when it loses its connection to the original WiMax network without having a viable alternative network (e.g., UMTS or EV-DO) ready for handoff.

FIG. 2 is a prior art representation of a typical sleep window/listen window sequence. It is an alternating sequence of fixed time intervals for the listen window 210 and the sleep window 220. During the listen window the multi-mode radio handset can exchange uplink (UL) and downlink (DL) data traffic with the base station to which it is currently connected. During the sleep window, the multi-mode radio handset can sleep, scan the current network for a neighboring base station, or scan for alternative networks.

In operation, the multi-mode radio handset enters a listen window 210 at time "A" and starts exchanging traffic with the basestation (BS) to which it is currently connected. At time "B", the multi-mode radio handset exits the listen window 210 and enters a sleep window 220. During the sleep window 220, the base station will buffer downlink data traffic destined for the multi-mode radio handset. The multi-mode radio handset can spend the time scanning for other networks or neighboring base stations. At time "C" the multi-mode radio handset is forced to enter the next listen window 210 and tune back into the base station regardless of whether it finished its scan during the sleep window 220. The base station assumes the multi-mode radio handset is back and begins sending any buffered data as well as any real-time data on the downlink and also provides bandwidth allocation for the multi-mode radio handset to transmit on the uplink. If the multi-mode radio handset has failed to tune back in, it will trigger unnecessary re-transmissions of data and could adversely affect system throughput and capacity. Depending on the type of application that the multi-mode radio handset is currently running when performing a network scan operation in a sleep window 220 period, the sleep window 220 period may not be long enough to do a complete network scan. In such cases, the multi-mode radio handset's ability to perform an inter-RAN handoff, if necessary, is hindered and service and/or session continuity can be lost. This is an extremely frustrating experience for the user.

FIG. 3 is a prior art data flow diagram for a typical sleep window/listen window sequence 300. As mentioned above, the multi-mode radio handset alternates between listen and sleep windows. In a typical sequence, the multi-mode radio handset will enter a listen window 310. While in the listen window, the multi-mode radio handset will exchange UL/DL data traffic with the base station to which it is connected 320. The multi-mode radio handset will exit the listen window 330 as the pre-defined listen window interval expires and will enter a sleep window 340. During the sleep window interval, the multi-mode radio handset will scan for other networks 350 that are within range of the multi-mode radio handset. Upon expiration of the sleep window interval, the multi-mode radio handset will exit the sleep window 360 and return to a listen window 310. This process will repeat over and over while the multi-mode radio handset is active.

FIG. 4 is a flowchart for a sleep window/listen window sequence according to the present invention. This figure illustrates how the typical sleep/listen window sequence 300 can be temporarily altered to allow the base multi-mode radio handset to extend the sleep window period to allow for more time to complete an off-channel network scan function. When the multi-mode radio handset is forced back to a listen window, a determination is made as to whether the multi-mode radio handset completed its scan function 410. If the determination is yes, then the process operates normally and the sleep window is exited 360. Otherwise, the multi-mode radio handset will request that the base station skip one or more listen windows to allow for more time 420. The request can contain specific parameters that define how many listen windows are to be skipped and how often to perform the skipping sequence. The base station receives the request 430. If the base station denies the request, then the process operates normally and the sleep window is exited 360. Otherwise, the base station will accept the request and create a new sleep/listen sequence with extended sleep windows based on the suggested parameters 440. Upon completion of the skipping sequence, the base station and multi-mode radio handset can revert back to the original sleep window/listen window sequence.

FIG. 5 is a representation of a sleep window/listen window sequence according to an embodiment of the invention. It is still an alternating sequence of fixed time intervals for the listen window 210 and the sleep window 220 like that shown in FIG. 2. However, the one or more of the listen windows have now been skipped in favor of extending the sleep window interval.

In operation, the multi-mode radio handset enters a listen window 210 at time "A" and starts exchanging data traffic with the basestation (BS) to which it is currently connected. At time "B", the multi-mode radio handset exits the listen window 210 and enters a sleep window 225. During the sleep window 225, the base station will buffer downlink data traffic destined for the multi-mode radio handset. The multi-mode radio handset can spend the time scanning for other networks or neighboring base stations. At time "C" the multi-mode radio handset determines that it has not had adequate time to finish scanning for other networks and, when entering the next listen window, requests that the base station skip one or more listen windows 215. If the base station allows, one or more listen windows 215 are skipped and the multi-mode radio handset will effectively get three times the time in an extended sleep window 225 to perform the scan by skipping a single listen window 215.

The step of requesting that the base station skip one or more listen windows can be achieved using an in-band signaling mechanism or an out-band signaling mechanism. In-band signaling can be in the form of a piggyback subheader or bandwidth stealing. Out-band signaling can be in the form of an information element embedded in a medium access control (MAC) management message.

Figure 6:
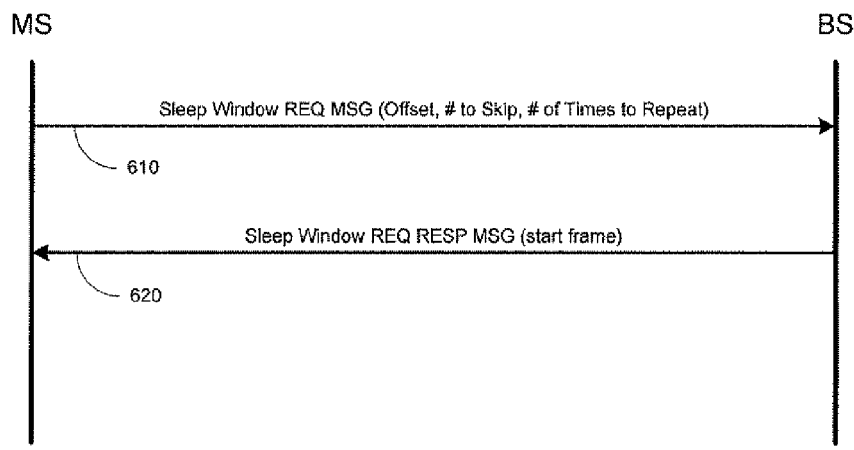
FIG. 6 is one method of providing in-band sleep window/listen window signaling between a radio handset and a base station.

FIG. 6 is one method of providing in-band sleep window/listen window signaling between a radio handset and a base station. In this embodiment, the multi-mode radio handset will create and send a message to the current basestation that can be termed a sleep window request message (Sleep Window REQ MSG (x,y,z)) 610. The Sleep Window REQ MSG contains parameters that define the scope of the request. There can be an offset parameter (x) that specifies the number of listen windows between the current listen window and the first of the listen windows to be skipped. It is likely that this number will be capped at four. A value of "0" indicates that the request would like to begin the skip pattern at the next listen window. The next parameter (y) specifies a number of consecutive listen windows to be skipped. It is anticipated that this value will be capped at eight. Skipping more than eight consecutive listen windows may have an adverse effect on system throughput, end-to end delay, and jitter. When determining the number of listen windows to be skipped, the multi-mode radio handset considers the delay and jitter budget of the most time critical application that the multi-mode radio handset is currently executing. The next parameter (z) specifies a number of times to repeat the skipping pattern. This value is also anticipated to be capped at eight. The base station will then return a sleep window request response message (Sleep Window REQ RESP MSG (start frame)) 620. The start frame parameter indicates an acknowledgment of when the new pattern will start so that the base station knows when to buffer DL data traffic rather than attempting to send the traffic if the multi-mode radio handset is not ready to receive.

Figure 7:
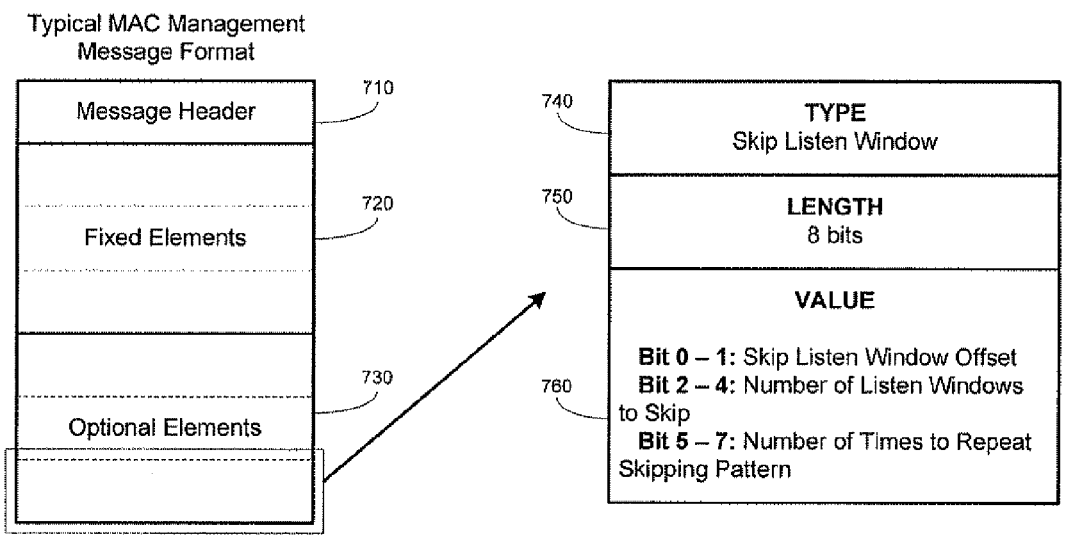
FIG. 7 is another method of providing out-band sleep window/listen window signaling between a radio handset and a base station.

FIG. 7 is another method of providing out-band sleep window/listen window signaling between a radio handset and a base station. A typical MAC management message format comprises a message header 710, fixed elements 720, and optional elements 730. Each element (fixed or optional) is presented in a type/length/value (TLV) form in which the type defines the kind of element, the length defines the length of the element usually in bytes, and the value defines the message encoding. For purposes of the invention, a TLV can be embedded in one of the optional element sections 730 of a MAC management message. The type 740 for the optional embedded element 730 can be assigned "skip listen window", the length 750 can be a single byte (8 bits), and the value 760 can be split among the bits to include skip listen window offset parameter occupying bits 0-1, a number of listen windows to be skipped parameter occupying bits 2-4, and a number of times to repeat pattern parameter occupying bits 5-7. In this example, the skip listen window offset parameter occupies a maximum of two bits leading to a maximum of four values. Similarly, the number of listen windows to be skipped parameter and the number of times to repeat pattern parameter each occupy a maximum of three bits leading to eight different values.

As an example, consider that the multi-mode radio handset sends an in-band signaling sleep window request message such as Sleep Window REQ MSG (2,3,2) or an out-band signaling piggyback sub-header containing the same values described above that the base station acknowledges and allows. The sequence would then be adjusted from S-L-S-L-S-L-S-L-... to S-L-S-L-S-S$_k$-S-S$_k$-S-S$_k$-S-L-S-L-s-S$_k$-S-S$_k$-S-S$_k$-S-L-S-L-S..., where S=sleep window, L=listen window, and S$_k$=skipped listen window. Thus, the sequence is altered from an alternating sleep-listen to a pattern in which 3 consecutive listen windows are skipped once the next two listen windows have occurred from the point of the request. The pattern is then repeated upon completion of the first cycle based on the number of times to repeat parameter. Once all the repeats have occurred the sleep/listen pattern reverts to the original alternating sequence until another sleep window request message is granted.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like. Prompts may also be audible, vibrating, etc.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method of selectively skipping one or more listen windows during sleep mode in a multi-mode radio handset capable of operating on a plurality of radio access networks (RANs) comprising:
   determining whether a remaining length of a sleep window is adequate to complete a scan of the plurality of RANs;
   in response to determining the remaining length of the sleep window is not adequate to complete the scan, signaling a serving base station to which the multi-mode radio handset is currently in communication to request that one or more listen windows be skipped wherein the request includes data defining an altered listen and sleep window sequence;
   receiving an acknowledgment from the serving base station indicating that the request has been granted wherein the acknowledgement includes a start frame parameter that defines when the altered listen and sleep window sequence will begin; and
   reverting back to the original alternating sequence of listen and sleep windows upon completion of the altered listen and sleep window sequence.

2. The method of claim 1 wherein the multi-mode radio handset will buffer uplink data traffic during the skipped listen windows.

3. The method of claim 1 wherein the data defining the altered listen and sleep window sequence includes an offset parameter that specifies the number of listen windows between the current listen window and the first listen window to be skipped.

4. The method of claim 1 wherein the data defining the altered listen and sleep window sequence includes a number of listen windows to be skipped parameter that specifies the number of consecutive listen windows to be skipped based on delay and jitter requirements of the most time critical application that the multi-mode radio handset is currently executing.

5. The method of claim 1 wherein the data defining the altered listen and sleep window sequence includes a number of times to repeat the altered listen and sleep window sequence parameter that specifies how often to repeat the altered listen and sleep window sequence before reverting to the original alternating sequence.

6. The method of claim 1 wherein the signaling comprises at least one of: in-band signaling in the form of a piggy-backed sub header, and out-band signaling in the form of an optional element embedded in a medium access control (MAC) management message.

7. The method of claim 1, wherein determining whether a remaining length of a sleep window is adequate to complete a scan of the plurality of RANs further comprises:
   determining whether the remaining length of the sleep window is adequate to complete the scan of the plurality of RANs based at least partially on a type of application currently running on the multi-mode radio handset.

8. The method of claim 1, wherein the determining whether a remaining length of a sleep window is adequate to complete a scan of the plurality of RANs occurs when entering a next listen window.

9. A multi-mode radio handset capable of operating on a plurality of radio access networks (RANs) comprising:
   a processor for controlling the operation of the multi-mode radio handset; one or more RF modules coupled with the processor for communicating with the plurality of RANs; and
   a software application for managing a sleep mode comprised of sleep windows and listen windows wherein the software application: determines whether a remaining length of a sleep window is adequate to complete a scan of the plurality of RANs, and
   in response to determining the remaining length of the sleep window is not adequate to complete the scan, requests from a base station an altered listen and sleep window sequence within the sleep mode such that one or more listen windows can be selectively skipped to allow for more time to perform a network scanning operation during an extended sleep window.

10. The multi-mode radio handset of claim 9 wherein the software application signals a serving base station to which the multi-mode radio handset is currently in communication to request that one or more listen windows be skipped, thus resulting in the altered listen and sleep window sequence, wherein the request includes data defining the altered listen and sleep window sequence.

11. The multi-mode radio handset of claim 10 wherein the software application receives an acknowledgment from the base station indicating that the request has been granted wherein the acknowledgement includes a start frame parameter that defines when the altered listen and sleep window sequence will begin.

12. The multi-mode radio handset of claim 11 wherein the software application reverts back to the original alternating sequence of listen and sleep windows upon completion of the altered listen and sleep window sequence.

13. The multi-mode radio handset of claim 11 wherein the request signal from the multi-mode radio handset to the serving base station is in the form of a piggy-backed sub header.

14. The multi-mode radio handset of claim 11 wherein the request signal from the multi-mode radio handset to the serving base station is in the form of an optional element embedded in a medium access control (MAC) management message.

15. A non-transitory computer readable medium storing a computer program product for selectively skipping one or more listen windows during sleep mode in a multi-mode radio handset capable of operating on a plurality of radio access networks (RANs), the non-transitory computer readable medium comprising:
    computer program code for determining whether a remaining length of a sleep window is adequate to complete a scan of the plurality of RANs;
    computer program code for in response to determining the remaining length of the sleep window is not adequate to complete the scan, signaling a serving base station to which the multi-mode radio handset is currently in communication to request that one or more listen windows be skipped wherein the request includes data defining an altered listen and sleep window sequence;
    computer program code for receiving an acknowledgment from the serving base station indicating that the request has been granted wherein the acknowledgement includes a start frame parameter that defines when the altered listen and sleep window sequence will begin; and
    computer program code for reverting back to the original alternating sequence of listen and sleep windows upon completion of the altered listen and sleep window sequence.

16. The non-transitory computer readable medium of claim 15 further comprising computer program code for buffering uplink data traffic during the skipped listen windows.

17. The non-transitory computer readable medium of claim 15 wherein the data defining the altered listen and sleep window sequence includes an offset parameter that specifies the number of listen windows between the current listen window and the first listen window to be skipped.

18. The non-transitory computer readable medium of claim 15 wherein the data defining the altered listen and sleep window sequence includes a number of listen windows to be skipped parameter that specifies the number of consecutive listen windows to be skipped based on delay and jitter requirements of the most time critical application that the multi-mode radio handset is currently executing.

19. The non-transitory computer readable medium of claim 15 wherein the data defining the altered listen and sleep window sequence includes a number of times to repeat the altered listen and sleep window sequence parameter that specifies how often to repeat the altered listen and sleep window sequence before reverting to the original alternating sequence.

20. The non-transitory computer readable medium of claim 15 wherein the computer program code for signaling is computer program code for at least one of: in-band signaling in the form of a piggy-backed sub header, and out-band signaling in the form of an optional element embedded in a medium access control (MAC) management message.

* * * * *